United States Patent [19]
Foster et al.

[11] 3,858,983
[45] Jan. 7, 1975

[54] SHAPED PRODUCT MEASUREMENT

[75] Inventors: George B. Foster, Worthington; Donald L. Cullen, Columbus; Albert C. Abnett, Westerville, all of Ohio

[73] Assignee: Autech Corporation, Columbus, Ohio

[22] Filed: Nov. 13, 1973

[21] Appl. No.: 417,365

[52] U.S. Cl.................. 356/163, 356/156, 356/212
[51] Int. Cl. ........................................... G01b 11/00
[58] Field of Search ........... 356/156, 161, 158, 163, 356/212, 167; 250/560, 577

[56] References Cited
UNITED STATES PATENTS

| | | | |
|---|---|---|---|
| 3,307,446 | 3/1967 | Rottman | 356/161 |
| 3,394,628 | 7/1968 | Mori | 356/212 |
| 3,565,531 | 2/1971 | Kane | 356/156 |
| 3,591,293 | 7/1971 | Maltby | 356/161 |
| 3,619,070 | 11/1971 | Pirlet | 356/163 |

*Primary Examiner*—James W. Lawrence
*Assistant Examiner*—D. C. Nelms

[57] ABSTRACT

There is disclosed a non-destructive dimension measuring and comparing system wherein a coherent light beam is impinged on a workpiece surface, and the back scattered radiation directed onto a vidicon to produce a pair of backscatter images representative of the geometry or spacing of the workpiece in relation to a reference. The system is particularly adapted to measure surface geometry and profiles of extruded shapes passing over a reference surface such as a roll. Electronic circuitry for processing the vidicon image signals includes noise rejection means permitting effective interpretation of backscatter images only slightly more intense than the ambient light level. A mechanical arrangement is provided by which the coherent light source, the vidicon, etc., are positioned and scanned in relation to the reference surface and the workpiece to allow extremely accurate measurement of small profile dimensions.

14 Claims, 6 Drawing Figures

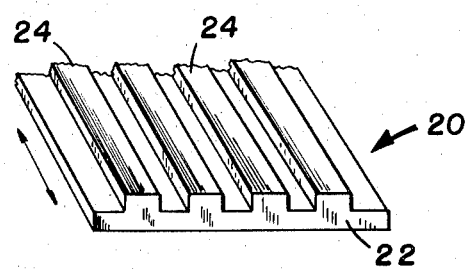
FIG. 1
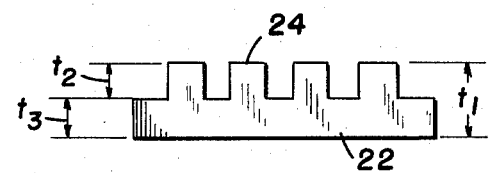
FIG. 2
FIG. 4

SHAPED PRODUCT MEASUREMENT

BACKGROUND OF THE INVENTION

This invention relates to non-destructive optical measuring and testing, and more particularly to the utilization of coherent light for accurate measurement of the geometry and profiles of complex workpiece surfaces.

Many manufacturing operations require simple and accurate gauging equipment capable of providing highly accurate continuous inspection of a workpiece. For example, accurate dimension control of a product may be essential where the dimensions are critical to the proper utilization of the product, or where good profitability requires minimum consumption of material.

Typically it is required that inspection be both continuous and non-contacting, to avoid interruption of or interference with the manufacturing process.

Several general approaches to the problem are known. For example, magnetic field sensitive devices such as variable reluctance pickups, and electric field sensitive devices such as capacitive pickups are available, but utilization of such equipment is highly dependent on the nature of the material being inspected and may be significantly effected by the surrounding magnetic and/or electric field environment. Radiation absorption devices such as beta gauges suffer from lack of resolution, and variable absorption due to the inhomogeneity of mass distribution in the workpiece, or due to the workpiece composition itself.

Optical devices of a variety of types are also known, usually employing the effects of incandescent or other non-coherent light reflected from the object under inspection. In most instances, however, such devices are subject to error caused by variation in ambient light conditions, reflectance, atmospheric conditions, and difficulties in handling a wide range of surface shapes and contours.

SUMMARY OF THE INVENTION

The advent of coherent radiation generators such as lasers has permitted the utilization of backscatter radiation in the development of highly accurate optical gauging equipment which successfully overcomes the difficulty with the prior art devices referred to above. Such a device, and indeed that preferred for utilization in accordance with the present invention, is shown in Assignee's co-pending Cullen, et al. U.S. Pat. application, Ser. No. 323,786, filed Jan. 15, 1973 and entitlted "Laser Dimension Comparator." To the extent pertinent, the disclosure of the aforesaid application is incorporated herein by reference.

Certain of the techniques disclosed in the Cullen et al. patent application have been found particularly useful, in the inspection of shaped products produced, for example, by a milling cutter, an extruder, or other continuous shaping process. Accurate and continuous inspection of shaped products can be obtained independent of ambient conditions, etc., even for products having extremely complicated and highly discontinuous dimensional variations of the order of 0.020 inches or less. By utilization of certain of the signal processing techniques disclosed herein, it is possible to process accurately backscatter radiation having an amplitude only slightly exceeding that of ambient light. This allows observation of highly reflective and non-reflective surfaces, Accordingly, it is an object of the invention to provide an improved laser dimension comparator for measuring surface geometry and profiles of a wide variety of workpiece shapes and compositions.

Another object of the invention is to provide a laser dimension comparator capable of providing accurate inspections of highly complex and discontinuous shapes.

A further object of this invention is to provide a laser dimension comparator which is highly insensitive to noise caused by ambient light and other effects. A more particular object of the invention is to provide such a laser dimension comparator in which information signals on the order of the ambient light level can be meaningfully interpreted.

A related object of this invention is to provide a laser dimension comparator including signal processing circuitry for distinguishing backscatter image signals from ambient light signals by processing the signals representing the backscatter radiation and ambient light in such a manner as to determine the approximate time when the backscatter signals will be present, and defining a signal processing interval only at that time.

An additional object of this invention is to provide a laser dimension comparator capable of measuring an elongated extended workpiece while the workpiece is passing over a reference surface such as a roll.

The related object is to provide a laser dimension comparator capable of accurately measuring the profile of an elongated workpiece by scanning the same transversely of its direction of elongation.

A more specific object of the invention is to provide a laser dimension comparator in which the gauging mechanism moves transversely of the object under inspection along a track having a number of local adjustments to vary the position of the gauging head from the reference surface along the length of the scan.

The above, and other objects of the present invention are achieved by the use of an optical gauging device such as disclosed in the aforementioned Cullen et al. patent application mounted on a track extending transversely of the direction of motion of the process under inspection. The track is mounted on a supporting plate with a series of adjustable positioning devices along its length allowing the track to be formed as necessary to adjust the position of the track, and hence the gauging mechanism in relation to the reference surface to compensate for non-uniformities in the reference surface along the gauging path.

As explained in the aforementioned Cullen patent application, the optical gauging system includes means for impinging a coherent light beam on the surface under observation and an optical system for collecting backscatter radiation, and for projecting two images thereof on a detector such as a vidicon. By scanning the vidicon, the two images define an electrical signal interval representative of the distance of the point of impingement on the workpiece from a reference position.

According to this invention, the signal output of the vidicon is processed by an adjustable threshhold circuit arranged to operate at some predetermined level in excess of that corresponding to the ambient light level. The vidicon output is processed by a second circuit which amplifies and differentiates the same thereby generating zero crossings corresponding to the peaks of the video signal. The latter signals are provided to a zero crossing detector circuit which is gated by the output of the adjustable threshhold circuit. The detector is thus conditioned only when the vidicon output is a predetermined level above ambient and produces pulse outputs representing the backscatter image peaks only. The time interval between successive zero crossing detector outputs represents the interval between the backscatter images. This interval is processed by customary digital techniques, to produce a measure of the distance between the point of impingement of the laser beam on the workpiece and the reference surface. For a workpiece or process continually in contact with the reference surface along the scan line, both the surface and the cross section of the workpiece can be inspected. In the Drawing:

FIG. 1 is an illustration of a shaped product suitable for inspection by means of the apparatus of the present invention;

FIG. 2 is a cross-sectional view of the product of FIG. 1 showing several dimensions to be measured;

FIG. 4 is a schematic representation of an optical gauging device useful in accordance with this invention;

DETAILED DESCRIPTION OF INVENTION

Referring first to FIG. 1, there is shown at 20 an example of a product which can be inspected using the techniques of the present invention. This product, actually a polyvinyl chloride (PVC) extrusion used in storage batteries to separate the battery plates is comprised of a base portion 22 and a series of transversely spaced elongated ribs 24. While the techniques of the present invention have utility substantially beyond the inspection of battery separator material, it is in this context that the details of the invention will be described.

With reference to FIG. 2, measurement of several different dimensions would be of interest, including the overall thickness $t_1$, the thickness $t_3$ of base portion 22, and the rib thickness $t_2 = t_1 - t_3$. By measurement of these dimensions it would be possible to control the amount of material utilized in manufacturing the product and also the separation between the battery plates in the assembled battery. Moreover, a battery plate separator as described, could be formed by an extrusion of polyvinyl chloride pellets, which occasionally has a tendency to clump, and clog an extruder opening. In that case, the product may lack one or more ribs 24, a condition which must be readily observable so that appropriate corrective action can be taken.

Figure 3:
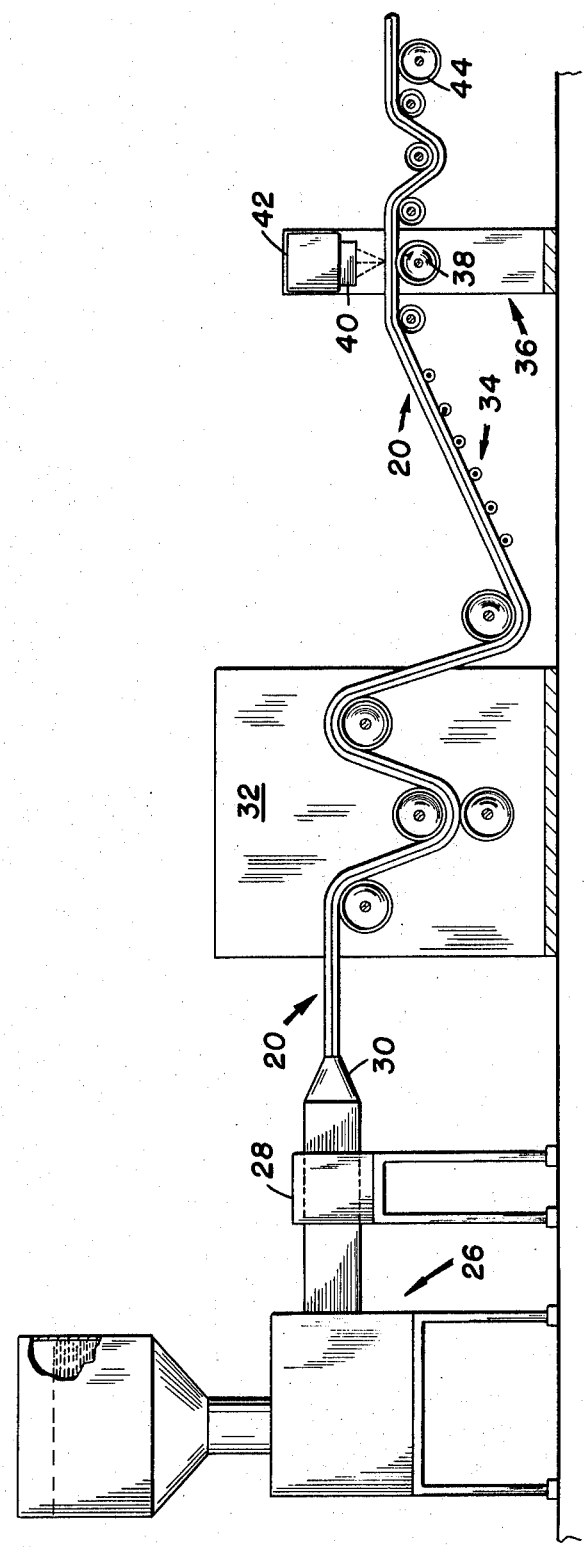
FIG. 3 is a schematic representation of apparatus for manufacturing the product of FIGS. 1 and 2 and for inspecting the same in accordance with the present invention.

In FIG. 3, there is shown the overall structure of an extrusion process for manufacturing the product shown in FIGS. 1 and 2. An extrusion mechanism, generally indicated at 26 includes a pump 28, and an extrusion head 30. The extruded product 20 exiting the head 30 passes into a crusher roll mechanism 32 and thence by means of a suitable conveyor mechanism 34 to an optical gauging stand 36.

Crusher roll mechanism 32 is shown as a general form of device by which pressure is applied along the surface of the still soft extrusion 20. The nature of the extruded material is such that as it passes out of the extruder, and cools, it tends to expand. By appropriate control of mechanism 32, the ultimate height $t_2$ of the ribs (see FIG. 2) can be controlled.

As the extruded material passes into gauging stand 36, it passes over a reference roll 38, and into the field of view of the optical gauging mechanism 40. The latter is arranged to travel axially of reference roll 38, i.e., into and out of the plane of FIG. 3, along a support mechanism generally denoted 42. After inspection, the material passes onto a takeup roll 44.

Support mechanism 42 may be constructed in any desired way to provide a stable track along which gauging mechanism 40 may travel under the control of a lead screw or the like.

One important consideration, however, is that accurate measurement of the dimensions of the workpiece 20 passing over reference roll 38 requires an essentially constant distance between the surface of the reference roll and the gauging head. In other words, any local distortions in the diameter of the reference roll, or runout of the track would result in variation of the position of the reference surface, introducing error into the measurement. Proper construction of the reference roll and its supporting structure, consistent with good engineering practice can minimize the difficulties and improve accuracy. An additional factor which permits highly accurate gauging in accordance with this invention is that the position of the track along which gauging mechanism 40 travels be adjustable at a number of points along its length to compensate for any misalignment, roll diameter variation, etc. which may exist. Any suitable adjusting mechanism may be employed. For example, the track mounts may be adjustably attached, as by set screws and locking bolts to a supporting structure or base plate. Placement of several such adjustment points along the length of the track allows extremely accurate positioning of the gauging head, and corresponding accuracy in measurement.

With regard to gauging unit 40 shown in FIG. 3, apparatus operating in accordance with the basic concepts of this aspect of the invention is discussed in detail in the aforementioned Cullen et al. patent application.

One suitable arrangement is shown in schematic form in FIG. 4. The gauging unit 40 includes a laser 48 to generate an optical beam 50, and a photo detection device such as vidicon 52. Coherent light beam 50 is reflected by means of a pair of mirrors 54 and 56 to a point of impingement 58 on workpiece 20. An additional pair of mirrors 60 and 62 receive backscatter light from the point of impingement 58 and direct the two light beams onto a mirror set 64. The reflection from the latter is collected by means of a suitable lens system 66 and directed onto the face of vidicon 52.

From the foregoing, it will be understood that the images on the face of the vidicon are a pair of light spots having a spacing depending on the distance between point of impingement 58 and gauging head 40. By scanning the vidicon, a pair of pulses is produced, at an interval depending on the vidicon scan rate to produce a signal interval representative of the distance being measured.

Referring still to FIG. 4, it will be appreciated that for certain positions of workpiece 20, the backscatter images produced by mirrors 60 and 62 will impinge exactly at the apex of mirror set 64 and thus produce a single image on the vidicon face. That particular workpiece position, which is a function of the geometry of the system, could be used as a reference distance against which the dimensions of the workpiece could be measured. However, in accordance with this invention, it is preferred to use as a reference position, not the abovementioned single image position, but rather the position of the reference surface, e.g., roll 38. Thus, recalling that gauging unit 40 scans transversely of the workpiece, i.e., into and out of the plane of FIG. 4 it may be appreciated that for a workpiece 20 narrower than the reference roll, gauging unit 40 will measure the position of the reference surface at least once per scan. This information can be utilized as described below to provide absolute measurement of the various dimensions described in connection with FIG. 2.

For a workpiece narrower than the reference roll, zero position data can be obtained once (or twice) per scan and the data processing circuity updated accordingly. A limit switch engaged when gauging unit 40 reaches a position in its scan at the end of the reference roll can be utilized to control the zeroing operation.

For the alternative situation of a workpiece having the same width as the reference surface, it will be appreciated that zero position data cannot be gathered while the system is in operation. In that case, a zero position measurement is taken without a workpiece in the field of view of the gauging unit and thereafter utilized for all workpiece measurements.

A mechanically actuated zeroing circuit may be utilized to enter the zero data into the system.

Still referring to FIG. 4, the output of vidicon 52 is connected as indicated to the video processing circuits from which the measurement data is obtained. Such circuity may be constructed by any conventional manner to convert the signal interval representing the image spacing on the vidicon into digital data by counting the output of a clock. In accordance with this invention, however, it is of particular importance that the data be appropriately pre-processed before the digital processing takes place to assure wide dynamic range, and capability for distinguishing backscatter images of intensity slightly greater than the ambient light.

Such capability can be important for two particular reasons. First, applications for gauging equipment such as disclosed herein may call for association with a reference roll having a highly reflective surface such as stainless steel. As will be appreciated, for such a surface backscatter is at a minimum. Other less reflecting surfaces such as, perhaps, the workpiece surface, may be a source of substantial backscatter. This can present a dynamic range problem, i.e., assuring accurate response to gross differences of backscatter radiation from the workpiece, and from the reference surface may be difficult. Occasionally, a highly reflective workpiece may be coupled with a less reflective reference surface producing the inverse problem.

Another situation in which the ability to distinguish signals close to ambient may be important is where extremely steep surfaces are being observed. If the angle of impingement of the laser beam is close to the Bragg angle for the material, the backscatter intensity may vary markedly with small changes in surface profile. Thus, appropriate signal processing may be of great importance. One final point to note with regard to FIG. 4 is the orientation of the major discontinuities of the workpiece surface relative to gauging head 40. In the illustrated and preferred embodiment, the impinging and backscatter beams define a plane which scans the workpiece. The alternate orientation, i.e., gauging head 40 rotated 90 degrees but still scanning into and out of FIG. 4, could result in portions of the workpiece surface obstructing one of the backscatter beams as the impinging beam encounters a specific discontinuities. (This can be visulaized by imagining the gauging head orientation as shown in FIG. 4 and the workpiece orientation shown in FIG. 2 at a moment the impinging beam strikes the vertical surface of one of the ribs 24). For this reason, the orientation of the plane of the optical paths should be such that the plane itself, rather than its edge intersects the major discontinuities of the workpiece surface.

Figures 5, 6:
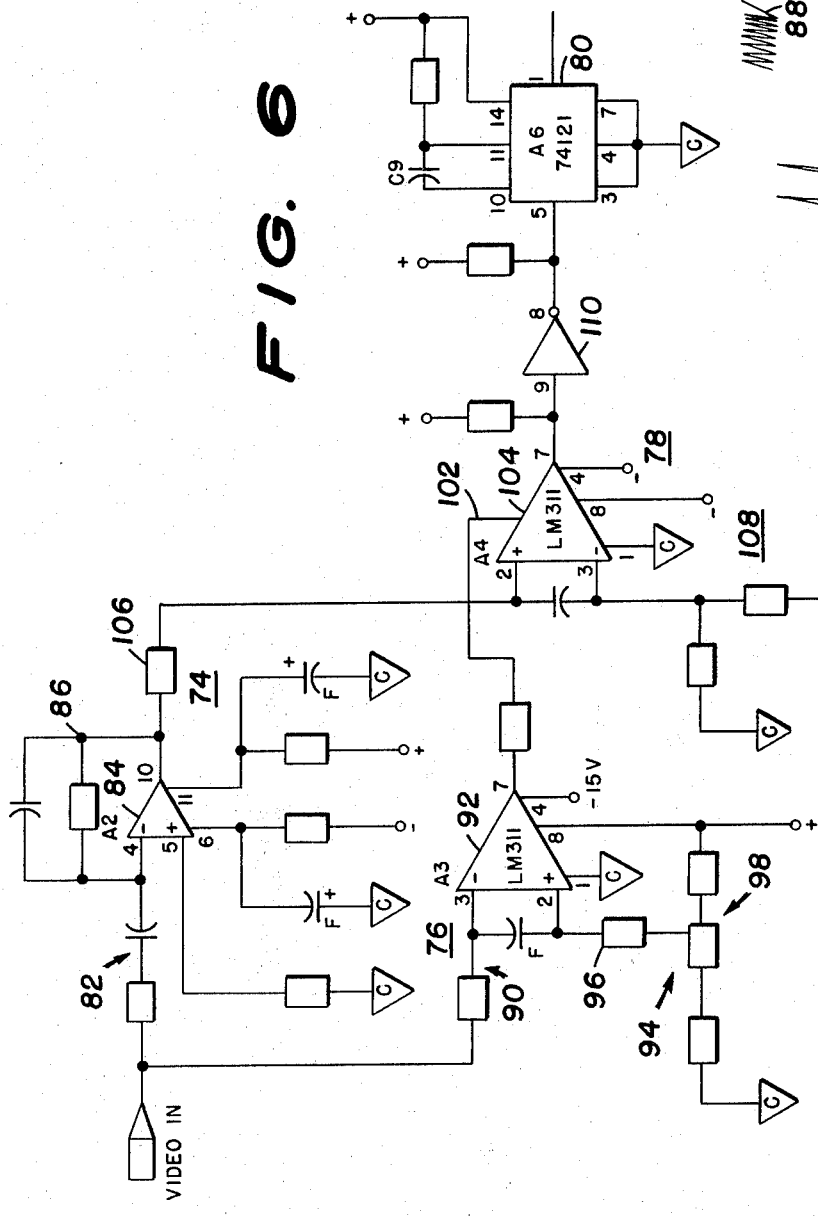
FIG. 5 is a block diagram of a video data preprocessing circuit in accordance with this invention.
FIG. 6 is a more detailed circuit diagram of the preprocessing circuit shown in FIG. 5.

FIG. 5 illustrates in block diagram form, a video pre-processing circuit used in accordance with the present invention.

As shown in FIG. 5, the video pre-processing circuit generally denoted 70 comprises a pre-amplifier 72 connected to the output of the vidicon, and driving a high gain amplifier 74, and a variable threshold detector circuit 76. Amplifier detector 78, the gating input for which is provided by the output of threshold detector 76. The output of zero crossing detector 78 is coupled to a single shot multivibrator to provide a pair of pulses representing the backscatter image spacing on the vidicon output.

Referring additionally to FIG. 6, there is shown a preferred embodiment of a circuit implementation of FIG. 5. Here, the output of video pre-amplifier 72 (not shown, but constructed in any suitable manner), is coupled to high gain amplifier circuit 74 through an input RC circuit 82. The latter is coupled as an input of an operational amplifier 84, having a parallel RC feedback circuit 86. This allows amplifier 84 to operate as a high gain differentiation circuit. The peaks of the video pre-amplifier output are thus converted into a succession of zero crossings as illustrated at 88 in the waveform shown in FIG. 5.

The output of pre-amplifier 72 is also coupled through an RC input circuit 90 as one input to a voltage comparator 92 comprising part of variable threshold circuit 76. The latter may comprise, for example an LM 311 integrated circuit comparator manufactured by Fairchild Instrument Corporation. A second input for comparator 92 is provided through a resistance circuit 94 including an input resistor 96, and a potentiometer circuit 98.

Comparator 92 is so constructed that its output is high when the sum of the two inputs exceeds zero. The setting of potentiometer circuit 98, and hence the second input to comparator unit 92 is adjusted as necessary in relation to the ambient light level output of the vidicon, to produce a positive comparator output for a desired vidicon output. Preferably, the potentiometer is set to provide a voltage level equal to one half that of the expected minimum level for the back scatter pulse. Thus, when the signal through input 90 exceeds the bias produced through resistor 96, the comparator operates. The output is a pair of positive pulses such as indicated at 100 in FIG. 5.

Referring again to FIG. 6, the output of variable threshhold detector 76 is resistance coupled to a control input at 102 of a second type 311 voltage comparator 104 comprising zero crossing detector 78. The signal inputs for comparator 104 are provided, first, through resistor 106 by the output of high gain amplifier circuit 74 and by a potentiometer circuit 108, the latter providing a bias reference against which comparator 104 operates.

Input 102 is a conditioning or "strobe" input allowing the circuit to produce a positive output in response to a net positive difference between the two signal inputs. Referring to the description of pulses 100 in FIG. 5, it may be seen that the strobe input conditions comparator 104 only when the vidicon signal is at least one half its minimum expectd peak value. Only then, i.e., when the backscatter signal is expected, can comparator 104 provide a positive output.

Recalling further that the output of high gain amplifier 74 is the derivative of the video signal, it is apparent that the video appear as zero crossings. Potentiometer circuit 108 is so adjusted that a positive input sufficient to operate the comparator 104 is present when the zero occurs. The conjunction of a zero crossing and the strobe signal produces a pair of pulses coincident with the peak of the backscatter image signals.

The output of comparator 104 is coupled through an inverting amplifier 110 comprising part of zero crossing detector 78 to the input of single shot multivibrator 80, shown in FIGS. 5 and 6. Multivibrator 80 operates in conventional fashion, and produces an output comprising a pair of squared pulses shown at 112 in FIG. 5, the leading edges of which represent the center of the backscatter images.

Conventional techniques of analog to digital conversion are utilized to convert the time interval between the leading edges of successive pulses 112 into a digital representation of the backscatter image spacing. For example, a counter, driven by a suitable clock is turned on by a first pulse 112, and thereafter turned off by the succeeding pulse to represent the time interval as a pulse count. Suitable circuitry for accomplishing this operation is found in the aforementioned Cullen et al. patent application. There, however, a particular measurement is referenced to a selectable position, or to the inherent system reference, i.e., the particular object spacing for which the two backscatter images impinge at the apex of mirror set 64 (see FIG. 4) and thus produce a single spot on the vidicon. In the present invention, however, all reference data is advantageously obtained from the position of the reference surface, and this position is used to establish the workpiece dimensions and profile.

The resulting measurements may be utilized in a number of ways. For example, observation of the workpiece profile and dimensions permits a continuous monitoring of product quality and adjustment, if necessary, of the manufacturing process. Also, the data may be used in an automatic control system by comparing actual measurements with preset standards and utilizing the difference information to adjust the manufacturing process automatically. For example, in the context of FIG. 3, measurement of the product, and comparison with the desired dimensions can be used to control the extruder pump mechanism 28, and the crusher mechanism 32 to maintain the desired product dimensions. Likewise, any gross deviation in the product dimensions, e.g., absence of one of the ribs due to obstruction of the extruder mechanism could be observed visually, or automatically by comparison with the expected profile, and the manufacturing process halted to permit repair.

In summary, then, the present invention is an electro-optical measuring system uniquely adapted to the observation and control of manufacturing processes in which a workpiece having a complicated profile passes over a reference surface through the field of view of a gauge. It will, of course, be recognized that the particular product shown in FIGS. 1 and 2 and the manufacturing process of FIG. 3 are only intended to be representative. For example, use with shaping processes other than extrusion and measurement, with respect to a linearly moving rather than a rotating reference surface are possible. Likewise, the physical structure for supporting the gauging mechanism described herein is also intended only to be representative. Other methods of scanning the laser beam, and means for supporting the gauging mechanism in an accurately controlled relationship to the reference surface may also be employed.

It is to be understood, therefore, that while the drawings and examples given describe a preferred embodiment of the invention, they are for the purpose of illustration only, that the apparatus of the invention is not limited to the precise details and conditions disclosed, and that various changes may be made therein without departing from the spirit of the invention which is defined by the following claims.

We claim:

1. An electro-optical gauging system for measuring a workpiece having one surface thereof in contact with a reference surface at the point of measurement, said system comprising a laser; means to direct a laser beam ontrthe surface of said workpiece opposite to that in contact with said reference surface; an optical detector; means for observing the point of impingement of the laser beam on the workpiece, means for directing a pair of backscatter images of said point of impingement onto said detector to produce a pair of images having a spacing related to the position of said workpiece surface; means for scanning said laser beams and said workpiece in relation to each other; means for storing data representative of the position of said reference surface; first signal processing means for generating a signal representative of the backscatter image spacing; and means responsive to said stored reference position data and said image spacing signal to develop an output representative of the position of the point of impingement of said laser beam on said workpiece in relation to said reference surface.

2. A gauging system as defined in claim 1 wherein said first signal processing means comprises threshhold detector means responsive to a component of the output of said optical detector exceeding a preset level to produce a gating signal; amplifier means responsive to the output of said optical detector to produce a signal having a peak component responsive of the backscatter images and a low amplitude component responsive of ambient light; and logic means responsive to said peak component and to said gating signal to generate a pair of well-defined pulses constituting said spacing signal.

3. A gauging system as defined in claim 2 wherein said amplifier means includes means for generating the derivative of the output of said optical detector.

4. A gauging system as defined in claim 3 wherein the peak component of said amplifier output is a zero crossing, and wherein said logic means includes means responsive to said zero crossing in conjunction with said gating signal to generate said spacing signal.

5. A gauging system as defined in claim 4 wherein said gating means includes means to adjust the preset level above which said gating signal is generated to about one half the expected peak value of the output of said optical detector.

6. A gauging system as defined in claim 1 wherein said scanning means comprises housing means for said laser and said optical detector; carriage means including means for mounting said housing in space relation to the surface of said workpiece and means for moving said housing and said reference surface in relation to each other.

7. A gauging system as defined in claim 6 further including adjusting means for maintaining essentially constant the distance between said reference surface and the image surface of said optical detector.

8. A gauging system as defined in claim 7 wherein said reference surface is in motion in a first direction, wherein said carriage means includes guide means for said housing, and drive means to move said housing along said guide means in a direction other than the direction of motion of said reference surface; and wherein said adjusting means comprises means to vary the position of at least one portion of said guide means toward and away from said reference surface.

9. A gauging system as defined in claim 8 wherein said adjusting means is adapted to deform said guide means whereby to adjust the spacing of portions thereof from said reference surface.

10. A gauging system as defined in claim 8 wherein said reference surface is a rotating cylinder adapted to carry said workpiece, wherein said guide means comprises an elongated track parallel to and spaced from the axis of said cylinder, and wherein said drive means comprises means to move said housing back and forth along said track.

11. A gauging system as defined in claim 10 including means for sensing the presence of said housing at at least one end of said track.

12. A gauging system as defined in claim 1 when said workpiece travels in a first direction; and wherein said scanning means comprises means for moving said laser beam across said workpiece in a direction transverse to said first direction.

13. A gauging system as defined in claim 12 wherein said laser and said detector are so oriented with respect to each other and the direction of scan of said laser beam that discontinuities of the workpiece surface intersect with the plane defined by the laser beam and the backscatter beams and not with the edge of said plane.

14. A gauging system as defined in claim 1 wherein said laser and said detector are so oriented with respect to each other and the direction of motion relative to said workpiece that discontinuities of the workpiece surface intersect with the plane defined by the laser beam and the backscatter beams and not with the edge of said plane.

* * * * *